J. McCREERY.
VENTILATING VALVE FOR SHIPS.

No. 592,532. Patented Oct. 26, 1897.

(No Model.) 3 Sheets—Sheet 2.

J. McCREERY.
VENTILATING VALVE FOR SHIPS.

No. 592,532. Patented Oct. 26, 1897.

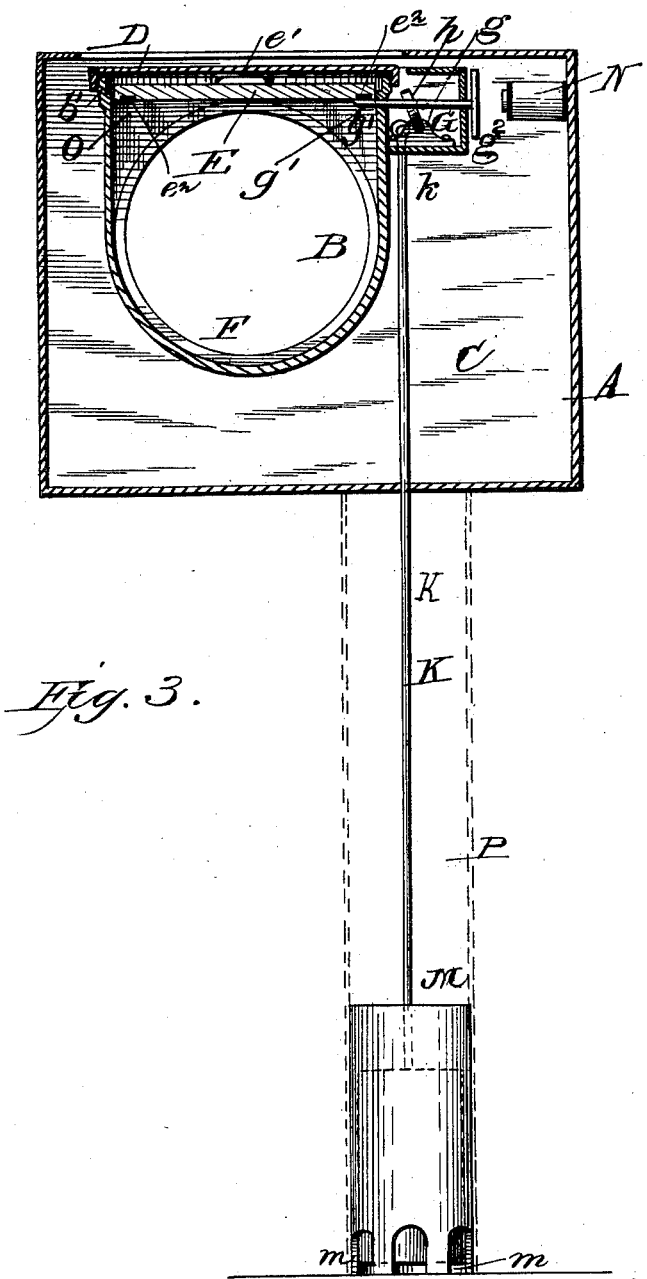

UNITED STATES PATENT OFFICE.

JOSEPH McCREERY, OF TOLEDO, OHIO.

VENTILATING-VALVE FOR SHIPS.

SPECIFICATION forming part of Letters Patent No. 592,532, dated October 26, 1897.

Application filed June 11, 1897. Serial No. 640,352. (No model.)

*To all whom it may concern:*

Be it known that I, JOSEPH McCREERY, a citizen of the United States, residing at Toledo, in the county of Lucas and State of Ohio, have invented certain new and useful Improvements in Valves to be Used in a System of Ventilation; and I do hereby declare the following to be a full, clear, and exact description of the invention, such as will enable others skilled in the art to which it appertains to make and use the same.

This invention relates to improvements in valves operated by floats; and it is designed more especially to be used in a system of ventilation devised by me and used for ventilating ships and other vessels. In any system of ventilation where pipes pass through the various compartments of a vessel there is danger, should water flood one compartment, of this water penetrating the ventilating-pipe and passing through such pipe into other compartments, even though the bulkheads between the various compartments be closed.

It is the object of the present invention to provide the ventilating-pipes with a valve in each compartment, so that should the compartment become flooded the valve will automatically close and effectually prevent water from passing into the adjoining compartment should the water penetrate the ventilating-pipe.

Figure 1:
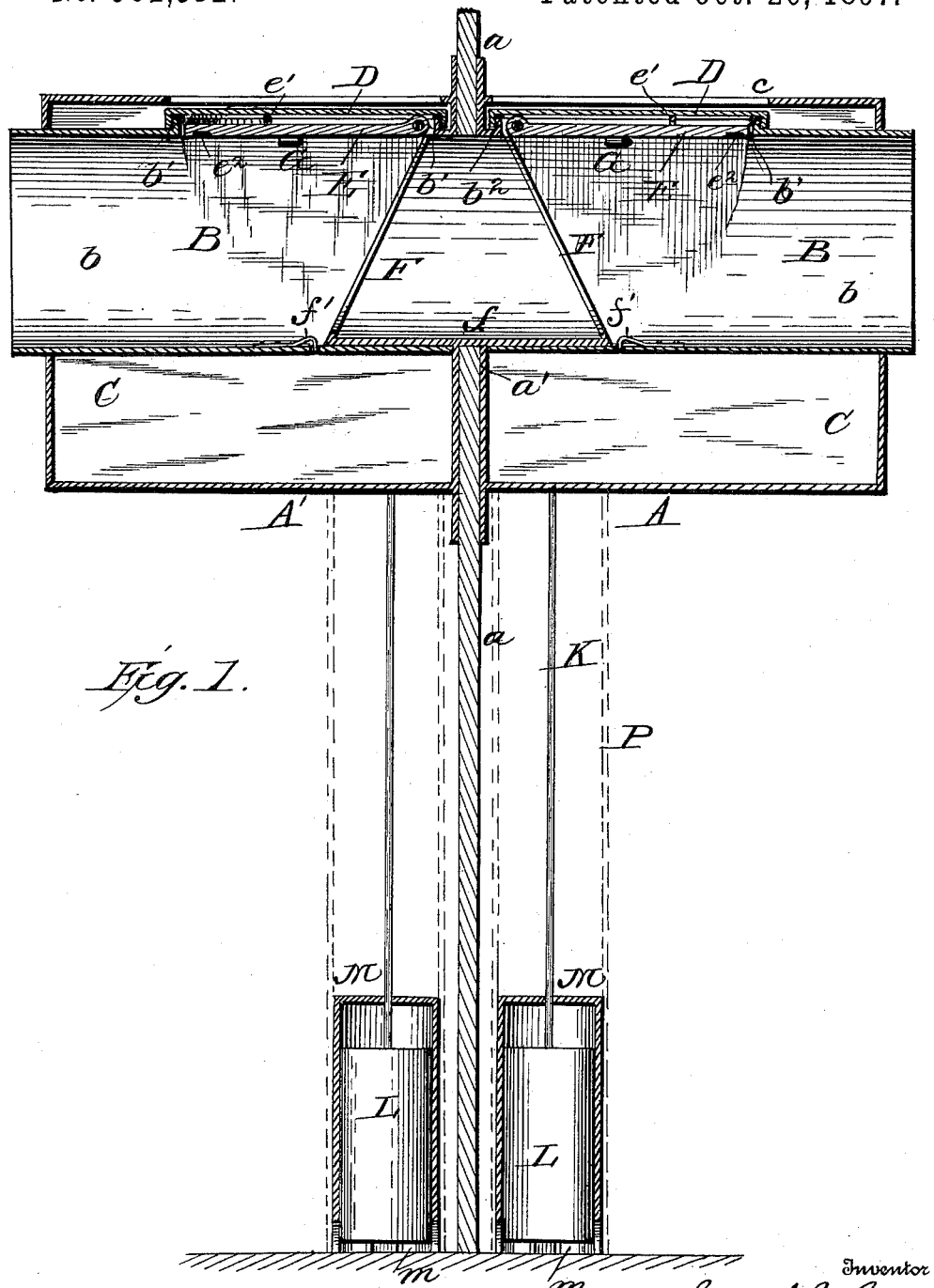
Figure 2:
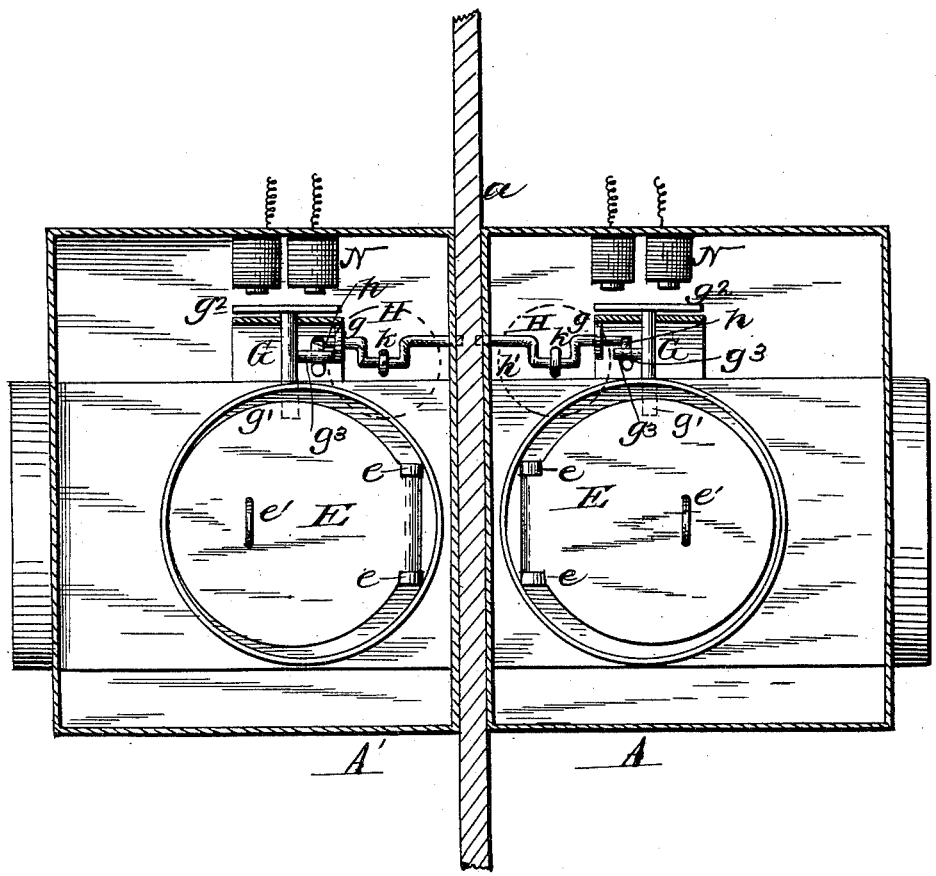

In the annexed drawings, Figure 1 represents a vertical longitudinal section of the device; Fig. 2, a top or plan view; Fig. 3, a vertical transverse section.

In the drawings, the letters A A' represent two compartments of a vessel separated by a bulkhead $a$, such bulkhead being normally closed. Through a hole $a'$ in such bulkhead passes the ventilating-pipe B. In this pipe B, on each side of the bulkhead, the invention is placed. As a pair of these devices are placed at each bulkhead, there will be two of them in each compartment, one at one side and one at the other; but when the compartment is at the end of a number of compartments only one such device is used; also, the device may be used to close a ventilating-opening in the bulkhead, even when no ventilating-pipe passes therethrough.

As the devices are duplicates, a description of one will be sufficient. The end $b$ of the pipe B has surrounding it a casing C. In the top of this casing is made a hole $c$, and registering therewith a hole $b'$ is made in the top of the pipe B. Around this hole $b'$ is a lip $b^2$, which may be threaded. Engaging this threaded lip $b^2$ is a cap or cover D, which closes the opening $b'$. Within the hole $b'$ at the end toward the bulkhead a hinged gravity-valve E is pivoted in the ears $e$. This valve E is provided on top with a handle $e'$ and underneath at the rim with a packing $e^2$. This valve E is made of a size and a shape to snugly fit the interior of the pipe B; but it may be made of such a length from the hinge to the packing that when it drops down it will not stand perpendicularly, but will be slightly slanted. At the place in the pipe B where the valve E would rest when down there is made in the interior of the pipe a circumferential collar F, and at the bottom of the pipe and between the two collars F of the two devices upon opposite sides of the bulkhead a plate $f$ may be placed in the bottom of the pipe B, so as to brace the bottoms of the collars F. A suitable spring or spring-bolt $f'$ may be used to hold the valve E when down, so as to assist the weight of the valve in preventing the latter from being unintentionally forced up.

To one side of the pipe B, in a suitable bearing $g$, is placed a lock-bolt G, the inner end $g'$ of which extends into the pipe B and rests under the valve E when the latter is up and holds the valve in its upper position. This bolt G may have a flat plate $g^2$ on its outer end. Extending from one side of this bolt G is a pin $g^3$. Engaging this pin $g^3$ is the end $h$ of a crank-shaft H. This shaft H is journaled in the bearing $g$ and also in the bulkhead $a$. To the crank $h'$ of this crank-shaft H is secured the upper end $k$ of a rod K, which extends downwardly and is secured to a float L, contained in a float-chamber M, near the bottom of the compartment, such chamber having openings $m$ in its bottom. Within the case $c$ an electromagnet N may be placed so that the plate $g^2$ is within the field of the magnet. This magnet N is connected by wires with any source of electricity. If desired, instead of hanging the valve E within the area of the pipe B an enlargement or rectangular swell O may be made in the pipe and the valve hung therein; also, a pipe P (shown in dotted lines) may extend from the pipe B surrounding the rod K and float-chamber M protecting them. Under normal conditions the valve E is open and held in its upper position by the bolt G. Should water enter the compartment, it will flow into the chamber M and, lifting the float L, will, through the rod K and shaft H, move the bolt G from under the valve E. The weight of the valve will cause it to drop into position against the shoulder F, the spring $f^2$ catching the lower end of the valve. Now should the water continue to rise in the compartment and enter the pipe B it will be effectually prevented from flowing into the adjoining compartment by the valve E being closed. At the same time water will not enter the section of pipe within the compartment unless this section of pipe shall have been damaged, because the cover D will prevent water from flowing into the section of the pipe B after the valve E has dropped. Should the float from any cause fail to work, the valve E may be dropped by closing the circuit through the electromagnet N, which would withdraw the bolt from under the valve E. All of the electromagnets in the vessel may be in the same circuit, so that all the valves may be operated at once, either for effectually closing the pipes should there be any serious damage done the vessel—as, for instance, in a war vessel in a battle—or if it is desired to test all the valves at once.

Having described my invention, what I claim is—

1. The bulkhead and the pipe passing therethrough, such pipe having located within it a gravity-valve, in combination with a lock-bolt for holding the valve up and open; a float and connections between the float and lock-bolt whereby the valve may be released and dropped when the float rises, as set forth.

2. The combination of the pipe, B, having the internal shoulder, F, and the valve, E, hung in said pipe and fitting the shoulder, with the lock-bolt, G, which engages the valve when it is open and means for releasing such lock-bolt, as set forth.

3. The pipe, B, and casing C, having registering openings, $b'$ and $c$, and the cover, D, fitting the opening, $b'$, in combination with the valve, E, hung in the pipe, B, the lock-bolt G which engages the valve when it is open and means for releasing such lock-bolt as set forth.

In testimony whereof I affix my signature in presence of two witnesses.

JOSEPH McCREERY.

Witnesses:
SAML. A. DRURY,
W. H. SINGLETON.